United States Patent [19]

Komarnicki et al.

[11] 4,079,954

[45] Mar. 21, 1978

[54] STABILIZING ASSEMBLY FOR CAMPER ATTACHMENTS AND THE LIKE TO TRUCKS

[76] Inventors: Roy Komarnicki, Box 1, Group 11, R.R. No. 1, Winnipeg, Canada, R3C 2G1; Alexander M. Gunness, 6123-48 Ave., Red Deer, Alta., Canada, V2E 1A4

[21] Appl. No.: 686,823

[22] Filed: May 17, 1976

[30] Foreign Application Priority Data

May 23, 1975 Canada .................................. 227631

[51] Int. Cl.² ............................................ B60G 11/00
[52] U.S. Cl. .................................. 280/104; 267/11 R
[58] Field of Search ............... 280/104, 689, 623, 626; 267/11 R, 11 A

[56] References Cited

U.S. PATENT DOCUMENTS

| | | | |
|---|---|---|---|
| 1,211,513 | 1/1917 | Williams | 267/11 R |
| 1,842,418 | 1/1932 | Mercier | 267/11 R |
| 2,770,468 | 11/1956 | Willingham | 280/689 |
| 3,353,839 | 11/1967 | Pistone | 280/104 |

Primary Examiner—Philip Goodman
Attorney, Agent, or Firm—Stanley G. Ade

[57] ABSTRACT

Camper bodies bolted to truck boxes are relatively top heavy and sway badly in normal use and can make driving hazardous. The stabilizing assembly includes a shackle connection on each side of the rear axle to which a stabilizing member is secured. The two members are pivotally connected to the truck body and linkage is provided interconnecting the two members so that when the chassis commences to lean in one direction, it is automatically checked by transferring the force to the opposite side of the truck body through the stabilizing members and the linkage.

6 Claims, 6 Drawing Figures

STABILIZING ASSEMBLY FOR CAMPER ATTACHMENTS AND THE LIKE TO TRUCKS

BACKGROUND OF THE INVENTION

The detachable mounting of camper bodies on truck boxes is extremely popular but unfortunately the weight distribution of said campers is such that the truck tends to be somewhat top heavy.

Considerable side sway often occurs with such combinations which can readily lead to loss of control by the driver. This side sway can be generated by high cross winds, bumpy road surfaces, and normal steering maneuvers all of which throw considerable strain on the attaching means as well as the aforementioned loss of control.

SUMMARY OF THE INVENTION

The present invention overcomes this side sway action by providing a stabilizer assembly which can readily be attached between the rear axle assembly and the truck body so that if the truck starts to sway in one direction, the forces generated are automatically transferred by the stabilizer assembly, to the opposite side of the truck body thus checking the side sway action before it generates dangerous conditions.

The principle object and essence of the invention is therefore to provide a device of the character herewithin described which is readily attachable to existing trucks and eliminates, to a great extent, any side sway when a camper unit is secured to the truck box.

Another object of the invention is to provide a device of the character herewithin described which also stiffens up the spring suspension of the rear axle thus compensating for the additional load caused by the mounting of the camper body.

A still further object of the invention is to provide a device of the character herewithin described which includes an overload assembly in the stabilizing assembly thereby preventing damage occurring to the linkage or connection.

Yet another object of the invention is to provide a device of the character herewithin described which includes adjustment means enabling same to be fitted to different makes and models of trucks.

A still further object of the invention is to provide a device of the character herewithin described which includes an embodiment enabling the assembly to be held clear of the differential housing of the rear axle.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
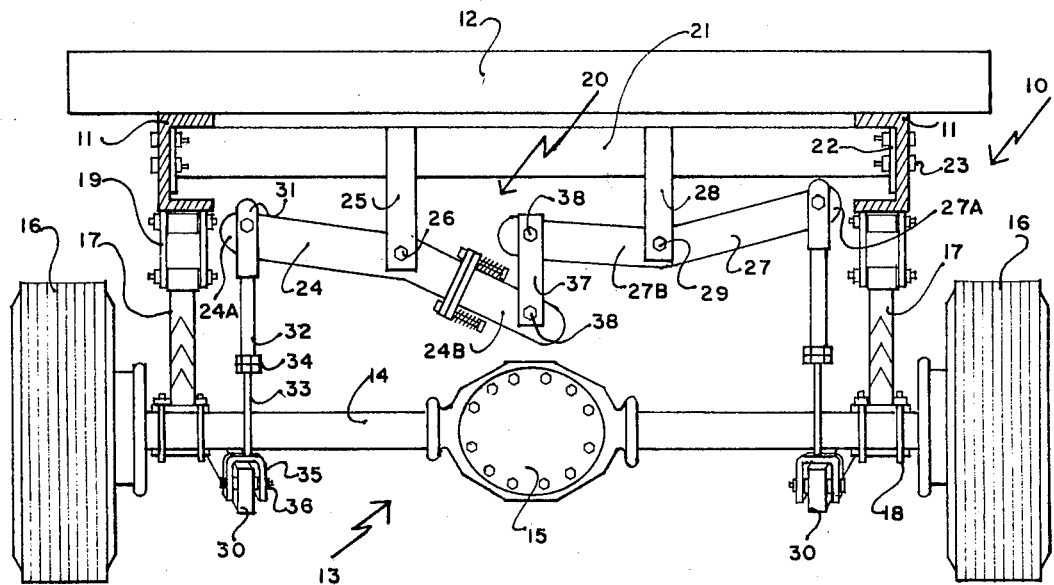
FIG. 1 is a partial rear view of a truck showing the preferred embodiment of the invention mounted thereon.
Figure 2:
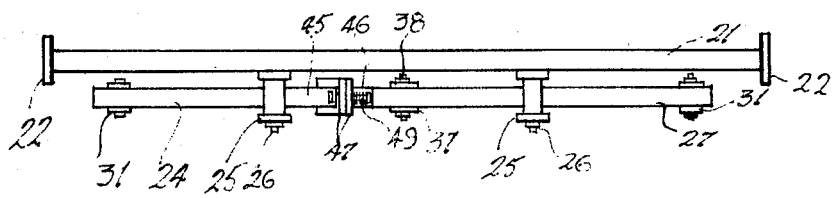
FIG. 2 is a plan view of the invention per se shown in FIG. 1.

Proceeding therefore to describe the invention in detail, reference should be made to the drawings in which 10 illustrates a partial rear view of a truck including a pair of spaced and parallel longitudinal chassis members 11 upon which a truck body 12 is mounted in the usual way. In the claims, the truck body 12 and the longitudinal chassis members 11 are defined as a truck body assembly.

A rear axle assembly 13 is provided including the axle halves 14 extending one upon each side of the differential 15 and mounting the rear wheels 16 in the usual way.

The truck body assembly is mounted upon the rear axle assembly 13 by means of leaf spring assemblies 17 secured to the rear axle by means of spring saddle assemblies 18 and secured to longitudinal chassis members 11 by means of the spring shackle components 19 all of which is conventional.

FIG. 1 shows the preferred embodiment of the invention collectively designated 20. It includes a mounting member 21 extending between the longitudinal chassis members 11 and being secured thereto by any convenient means. In the present embodiment, this comprises a plate 22 welded to each end of the mounting member 21 and in turn bolted to the web 11A of the longitudinal chassis members 11 by means of the fastening assemblies 23.

A first stabilizing member or link 24 is provided and is pivotally mounted intermediate the ends thereof between a pair of plates 25 which in turn are secured to one side of the mounting member 21. A pivot pin assembly 26 extends through the plates and through the member 24 as clearly shown.

A second stabilizing member 27 is also mounted between a further pair of plates 28 secured to the mounting member 21 and a pivot pin assembly 29 extends through the plates 28 and through the members 27 in a manner similar to that hereinbefore described and it will be noted that the pivotal mounting of the stabilizer 24 is on one side of the body assembly and the pivotal mounting of the second stabilizing member 27 is upon the opposite side of the truck body assembly or mounting member 21.

Although in this embodiment, the mounting member 21 is provided between the longitudinally extending chassis members 11, nevertheless it will be appreciated that the stabilizing members 24 and 27 could be mounted in a similar manner to a downward extension of the truck box 12 if convenient.

Support members 30 are secured by one end thereof to the spring saddle assemblies 18 either by means of welding or by being bolted to a plate extending from and supported by these spring saddle assemblies. However as the method of fastening these support members is a matter of choice, it is not believed necessary to show further details thereof.

These support members 30 extend rearwardly from the rear axle assembly 13 and support the outer ends 24A and 27A of the stabilizing members 24 and 27 respectively. A yoke 31 is pivotally secured adjacent the outer ends 24A and 27A and a cylindrical member 32 is secured to yoke 31 and extends downwardly therefrom. A screw threaded adjusting rod 33 screw threadably engages the tube 32 so that the overall length of the connecting assembly can be adjusted within limits. A lock nut 34 locks the rod 33 in the desired relationship with the tube 32.

A further yoke 35 is provided at the bottom end of the rod 33 and this yoke extends over the end of the support member 30 and is pivotally secured thereto by means of a pivot pin assembly 36.

Means are provided to connect the inner ends 24B and 27B of the stabilizing members 24 and 27 which, when they are mounted to the mounting member 21, are in substantially vertical spaced relationship one with the other as clearly illustrated. In this connection a pair of link plates 37 extend between these ends 24B and 27B and are connected to these ends by means of pivot pin assemblies 38.

In operation, if the truck body assembly commences to sway for example in the directon indicated by arrow 39, the force generated by the downward movement of the lefthand side of the truck body assembly, with reference to FIG. 1, is automatically transferred through the stabilizing assembly, to the opposite side of the truck body assembly and applies a substantially equal force in the same direction thus preventing the right hand side of the body with reference to FIG. 1, from rising thus eliminating the side sway as soon as it is initiated.

Figure 4:
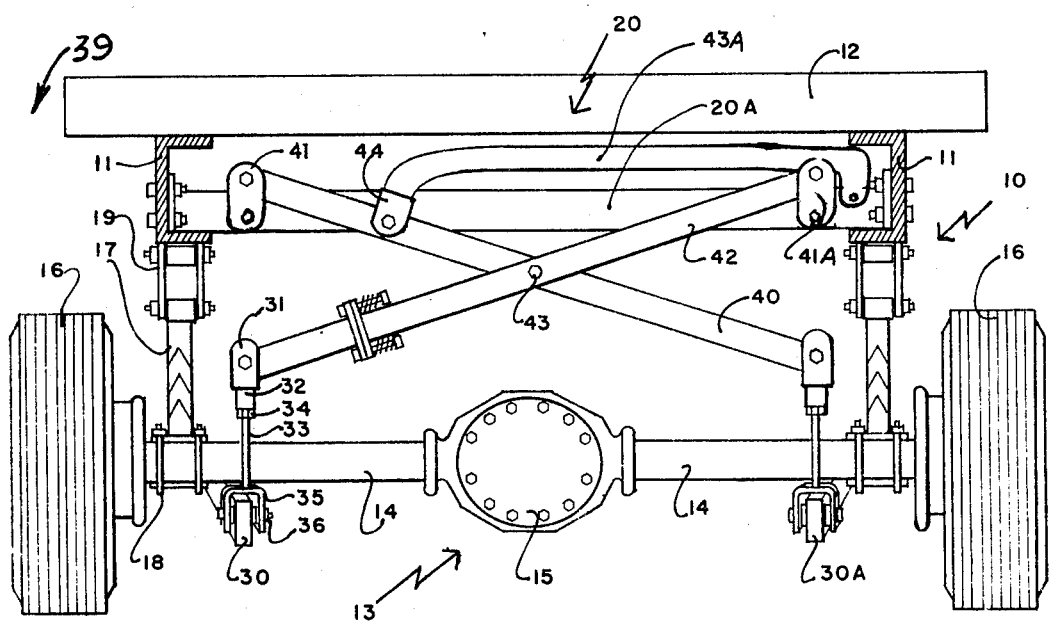
FIG. 4 is a view similar to FIG. 1 but showing an alternative embodiment of the invention.

FIG. 4 shows an alternative embodiment in which a first stabilizing member 40 is pivotally secured by one end thereof to a shackle assembly 41 extending upwardly from a mounting member 20A which is secured between the longitudinal chassis members 11 in a manner hereinbefore described.

This manner 40 extends across diagonally and downwardly and is connected to a mounting member 30A on the opposite side of the rear axle assembly 13 by structures similar to that hereinbefore described so that similar reference characters have been given with the exception that the suffix "A" has been added.

A second mounting member 42 is pivotally secured by one end thereof between a further shackle assembly 41A extending upwardly from the mounting member 20A on the opposite side of the truck body assembly. This second stabilizing member also extends diagonally and downwardly towards the opposite end of the rear axle assembly 13 and is connected in a manner similar to that described for stabilizing member 40.

A pivot pin assembly 43 extends through the two members 40 and 42 at the point of intersection thereof and a stabilizing bar 43A is pivotally secured by one end thereof to the mounting member 20A adjacent the shackle assembly 41A. The other end of the stabilizing bar 43A is provided with a yoke 44 thus providing a pivotal connection to the first stabilizing member 40 at a point intermediate the pivot pin assembly 43 at the intersection of the two members and the mounting of the first member 40 upon shackle assembly 41A.

Once again the action is similar to that hereinbefore described but this particular embodiment enables same to be mounted clear of the differential housing if the construction of the truck causes this housing to interfere.

In both embodiment, an overload assembly is provided on at least one of the stabilizing members.

Figure 3:
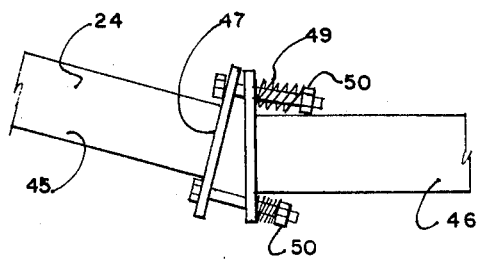
FIG. 3 is an enlarged fragmentary view of the spring overload assembly shown in the open position.

Details of this are shown in FIG. 3 in which the stabilizing member 24 is formed in two portions, a first or outer portion 45 and a second or inner portion 46. The adjacent ends of these portions 45 and 46 are provided with a plate 47 secured as by welding transversely to the ends of the portions 45 and 46. Nut and bolt assemblies 48, or the like, extend through apertures formed in these plates above and below the portions 45 and 46 and compression springs 49 extend around the bolts between the nuts 50 and the plate on the inner portion 46. By tightening or loosening the nuts 50, the tension of the springs 49 can be adjusted within limits.

The pressure of these springs normally maintains the two plates in interfacial relationship so that the stabilizing member 24 is held in a unitary condition. If however severe overload occurs, then the portions 45 and 46 can move relative to one another as illustrated in FIG. 3, against the pressure of the springs which will return the two plates to the interfacial relationship as soon as the overload condition is removed. This prevents damage occurring to the linkage and to the general structure of the device and has been included as a safety measure.

Figure 5:
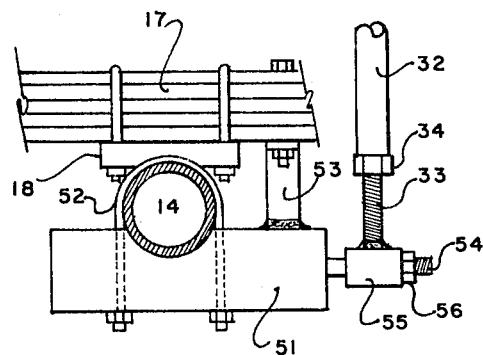
FIG. 5 is a fragmentary side view showing one method of attachment to the rear axle and spring assembly.
Figure 6:
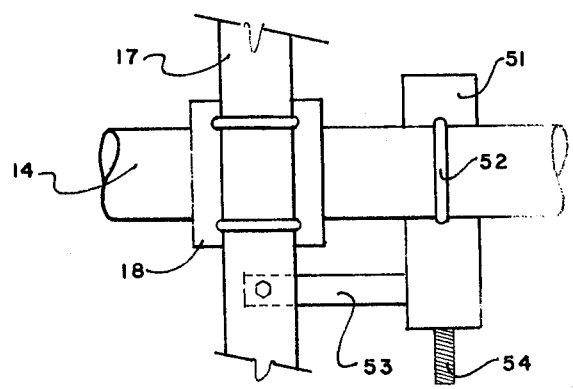
FIG. 6 is a plan view of FIG. 5.

Referring back to the connection of the adjustable portions to the ends of the stabilizing members, FIGS. 5 and 6 show one embodiment which is adaptable for use with the majority of makes and models of trucks.

It consists of a short length of tubing 51 having a cut-out portion intermediate the ends thereof enabling it to engage underneath the axle housing 14. It is secured in position by means of a U bolt clamp assembly 52 as illustrated and includes an offstanding bracket 53 which may be bolted to the spring 17 to steady the assembly. A plug (not illustrated) is welded into one end of tubing 51 and a screw threaded bolt 54 is secured to the plug and extends outwardly therefrom in alignment with the longitudinal axis of the tube.

The lower end of the screw threaded rod 33 is provided with a bearing or bushing housing 55 which engages over the bolt 54 and is secured in position by means of nut 56. The bushing (not illustrated) within the housing 55 is preferably of a resilient material well known in mountings of this kind. Alternatively, of course, a yoke similar to yoke 55 may be provided and engaged over the bolt 54 in a pivotal relationship similar to that hereinbefore described.

All of the pivot points or bushings are preferably provided with rubber bushing mounts which are conventional, the size and strength of which are suited to the particular load experienced at the individual locations.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A stabilizer assembly for use on trucks which includes a truck body assembly including a truck box mounted upon a pair of spaced and parallel longitudinal chassis members, a rear axle assembly, and spring assemblies mounting said chassis members to said rear axle assembly, said stabilizer assembly comprising in combination a first stabilizing member pivotally securing between one side of said truck body assembly and adjacent one end of said rear axle assembly, a second stabilizing member pivotally securable between the other side of said truck body assembly and adjacent the other end of said rear axle assembly, and means pivotally connecting said first and second stabilizing members together whereby the initiation of any substantial vertical movement on one side of said truck body assembly relative to said rear axle, generates a force on one of said stabilizing members and automatically transfers a similar force to the other side of said truck body assembly relative to said rear axle, through the other of said stabilizing members thus damping out said vertical movement, and overload spring means in at least one of said stabilizing members, said one stabilizing member having a first portion and a second portion, plates secured transversely to the adjacent ends of said first and second portions, and spring loaded fastening means extending through said plates normally holding same in interfacial relationship one with the other.

2. The assembly according to claim 1 in which said first stabilizing member is pivotally securable by one end thereof to adjacent said one end of said rear axle assembly and is pivotally securable intermediate the ends thereof to the same side of said truck body assembly inboard of the connection of said first stabilizing member to said rear axle assembly, and said second stabilizing member being pivotally securable by one end thereof to adjacent said other end of said rear axle assembly and being pivotally securable intermediate the ends thereof to the other side of said truck body assembly inboard of the connection of said second stabilizing member to said rear axle assembly, said means pivotally connecting said first and second stabilizing members together extending between the other ends of said first and second stabilizing members.

3. The assembly according to claim 1 in which said first stabilizing member is pivotally secured by one end thereof to one side of said truck body assembly and by the other end thereof to adjacent the opposite end of said rear axle assembly, said second stabilizing member being pivotally securable by one end thereof to the other side of said truck body assembly and by the other end thereof to adjacent the other end of said rear axle assembly, said first and second stabilizing members lying in opposite diagonal relationship one with the other when installed, said means pivotally connecting said first and second stabilizing members together being located at the intersection of said first and second stabilizing members and comprising a pivot pin extending through said intersection, and a stabilizing bar pivotally secured by one end thereof to one end of one of said stabilizing members and being secured by the other end thereof to a point on the other of said stabilizing members situated between the said intersection of said first and second stabilizing members and the said other end of the other of said stabilizing members.

4. The assembly according to claim 1 which includes means for adjusting the relationship, within limits, of said first and second stabilizing members with said rear axle assembly.

5. The assembly according to claim 2 which includes means for adjusting the relationship, within limits, of said first and second stabilizing members with said rear axle assembly.

6. The assembly according to claim 3 which includes means for adjusting the relationship, within limits, of said first and second stabilizing members with said rear axle assembly.

* * * * *